United States Patent [19]

Bertholet

[11] Patent Number: 5,159,124

[45] Date of Patent: Oct. 27, 1992

[54] OBTAINING COMPOUNDS FROM WAX SAPONIFICATION

[75] Inventor: Raymond Bertholet, Blonay, Switzerland

[73] Assignee: Nestec S.A., Vevey, Switzerland

[21] Appl. No.: 772,776

[22] Filed: Oct. 7, 1991

[30] Foreign Application Priority Data

Oct. 23, 1990 [CH] Switzerland ............. 3382/90

[51] Int. Cl.$^5$ .............................................. C07C 27/02
[52] U.S. Cl. ................................................... 568/877
[58] Field of Search ....................... 568/877, 920, 921

[56] References Cited

U.S. PATENT DOCUMENTS 4,117,251 9/1978 Kaufhold ....................... 568/877

FOREIGN PATENT DOCUMENTS 155143 8/1985 Japan.
2105699 3/1983 United Kingdom.

*Primary Examiner*—Marianne M. Cintins
*Assistant Examiner*—Rebecca Cook
*Attorney, Agent, or Firm*—Vogt & O'Donnell

[57] ABSTRACT

An aqueous acid solution is mixed with an organic water-immiscible solvent which contains saponified and unsaponified compounds, which are obtained by saponifying a wax with an alkali in the solvent, to obtain an acidified mixture having a pH of from 2.5 to 4. The mixture is allowed to separate into an aqueous phase and an organic phase, and then the aqueous phase is separated from the organic phase. An alkaline earth metal hydroxide is mixed with the organic phase to form salts of fatty acids, and in cases when an insoluble material is formed from the organic phase, the insoluble material is separated from the organic phase. Unsaponified compounds are obtained from the organic phase by evaporating the organic phase. Salts of fatty acids may be removed from the compounds.

12 Claims, No Drawings

OBTAINING COMPOUNDS FROM WAX SAPONIFICATION

BACKGROUND OF THE INVENTION

This invention relates to a process for obtaining unsaponifiable compounds emanating from natural waxes of animal or vegetable origin.

The saponification of a wax enables two main fractions to be obtained. These two fractions, of which the precise composition depends on that of the wax, mainly contain:

salts of fatty acids generally soluble in water the (saponified fraction), and long-chain ($C_{22-34}$) organic compounds, such as aliphatic alcohols, insoluble in water (the unsaponified fraction).

Some of the compounds contained in the unsaponified fraction, hereinafter referred to as unsaponifiable compounds, are of particular interest either as such or after isolation and purification, for example as a nutritive substance for plants.

According to UK Patent application GB 2,105,699 a vegetable wax is saponified in a mixture of benzene and ethanol, the solvents are evaporated after saponification and the residue is extracted with a water-immiscible organic solvent to give a compound which can be used as such in aqueous solution or in combination with an emulsifier as a nutritive substance for plants. However, this process involves the use of large quantities of various solvents which can give rise to problems of cost and/or safety on a industrial scale.

The problem addressed by the present invention was to provide a process for obtaining unsaponifiable compounds emanating from natural waxes which would be simple and easy to carry out, even on an industrial scale, by using only a single solvent in moderate quantities throughout its operation.

SUMMARY OF THE INVENTION

The present invention relates to a process in which a wax freed from oil is saponified in an organic water-immiscible solvent in the presence of an alkali, the saponified mixture is acidified to pH 2.5–4.0 by addition of an aqueous acid solution, the aqueous phase is removed, an alkaline-earth metal hydroxide is added to the organic phase, any insoluble fractions formed are removed and the solvent is evaporated to obtain the desired compounds.

DETAILED DESCRIPTION OF THE INVENTION

Hereinafter, parts and percentages are by weight.

To carry out the process according to the invention, a wax freed from oil is saponified in a water-immiscible organic solvent in the presence of an alkali.

Thus, it is possible to saponify any natural wax preferably having a high content of unsaponifiable compounds and a low content of unsaturated fatty acids. For example, the wax may be a wax of vegetable origin, such as a rice bran wax, a carnauba wax or a candelilla wax, or a wax of animal origin, for example beeswax. The process according to the invention may also be applied to a wax mainly containing unsaturated fatty acids, such as jojoba oil. The wax has first to be freed from oil, i.e., separated from any glycerides, particularly triglycerides, which it might contain in the natural state.

Saponification is carried out in a water-immiscible organic solvent capable of dissolving the waxes to be saponified and the alkali and also the desired unsaponifiables. It is preferred to use a solvent of which the boiling point is not too low, preferably above 75°–80° C., so that the reaction medium can be sufficiently heated and the waxes completely hydrolyzed. Butanol or pentanol is preferably used. The alkali used is any alkali capable of saponifying a wax, for example potassium hydroxide. Saponification may be carried out for 1 to 2 hours with continuous stirring at a temperature of 95° to 120° C.

The saponified mixture is then acidified to a pH of 2.5.to 4.0, for example by addition of an aqueous solution of a strong acid, such as sulfuric acid. More particularly, 75 to 100 parts of a 3 to 6% aqueous sulfuric acid solution may be added to 100 parts saponified mixture. The acidified mixture may be homogenized for 10 to 20 minutes at a temperature of 75° to 85° C. to obtain complete acidification and may then be left to settle so that the aqueous and organic phases separate.

The aqueous phase, which inter alia contains the salt of the strong acid formed during acidification and the excess acid, is then removed. The organic phase contains inter alia the desired unsaponifiable compounds and saturated and unsaturated fatty acids. An alkaline-earth metal hydroxide is added to the organic phase to form the metal salts of the free fatty acids mentioned. The alkaline-earth metal hydroxide is preferably selected so that the fatty acid salts formed are insoluble in the organic solvent used. Particularly suitable alkaline-earth metal hydroxides are the hydroxides of barium or magnesium, calcium hydroxide being preferred.

For example, 2 to 4 parts hydroxide may be mixed with 100 parts organic phase and the resulting mixture left to react for to 3 hours at 70° to 90° C. with continuous stirring so that the metal salts of the fatty acids are formed, after which, any insoluble fractions formed may be removed by hot filtration at 70° to 90° C. It has been found that only part of the fatty acid salts precipitate, mainly the saturated acid salts, the unsaturated acid salts generally remaining in solution with the required unsaponifiable compounds in the organic phase. The insoluble fractions are removed, for example by hot filtration, after which the organic solvent is evaporated to obtain the required unsaponifiable compounds. These compounds may then recrystallized from a suitable solvent to remove inter alia the fatty acid salts which have not precipitated.

EXAMPLES

The invention is illustrated in more detail in the following Examples.

EXAMPLE 1

A mixture containing 100 g rice bran waxes, 30 g 85% potassium hydroxide and 1 liter 1-butanol is prepared. The mixture is placed under a nitrogen atmosphere and heated for about 60 minutes to 100°–105° C. with continuous stirring at 60 r.p.m. An aqueous solution containing 750 ml water and 25 g 98% sulfuric acid is added to the saponified mixture. The mixture is continuously stirred for 5 minutes at a temperature of about 80° C. so that acidification is complete. The mixture is then left to settle, forming two phases, namely a lower aqueous phase and a supernatant organic phase. The aqueous phase, which has a pH of about 3, is removed while the organic phase is retained. 30 g calcium hydroxide are added to the organic phase and the mixture is stirred for 60 minutes at a temperature of approximately 80° C. The calcium salts of the saturated fatty acids present in the butanol phase precipitate in the form of beige crystals.

A filtration support in the form of 40 g Celite is then added to the mixture, followed by stirring for 5 minutes at 80° C. The butanol phase is hot-filtered and the residue is washed with 100 ml 1-butanol at 80° C.

The butanol present in the butanol phase is evaporated under reduced pressure in a rotary evaporator turning at 60 r.p.m. at a temperature of 70° C. 60 g of a crude product in the form of a brown brittle wax still containing traces of butanol are thus obtained. The crude product may be recrystallized, for example by dissolving the wax in 1 liter 94% ethanol at 70° to 80° C., stirring for 30 minutes, hot filtration at 70° C. and evaporation under reduced pressure of the ethanol. 52.5 g of an end product in the form of a beige powder are thus obtained. The following Table shows the composition of the end product thus obtained, as determined by gas phase chromatography-mass spectrum (GC/MS):

TABLE 1

|  | % |
| --- | --- |
| Residual fatty acids including | 5.8 |
| palmitic acid (C 16:0) | 1 |
| behenic acid (C 22:0) | 1 |
| lignoceric acid (C 24:0) | 1.8 |
| Alcohols including | 90 |
| octacosanol ($C_{28}$) | 12 |
| triacontanol ($C_{30}$) | 22 |
| dotriacontanol ($C_{32}$) | 18 |
| tetratriacontanol ($C_{34}$) | 15 |
| Others (including alkanes, alkenes, sterols and lactones) | 4.2 |

Accordingly, the process according to the invention enables the required compounds, mainly long-chain ($C_{16-38}$) fatty alcohols, to be obtained in a yield of the order of 53%.

EXAMPLE 2

The unsaponifiables of a carnauba wax and a candelilla are extracted in the same way as described in Example 1.

The following results are obtained:

|  | Carnauba wax | Candelilla wax |
| --- | --- | --- |
| Final yield | 53.1% | 53.2% |
| Residual fatty acids | 3.8% | 7.4% |
| Alcohols | 90.0% | 88.0% |
| Principal alcohols | $C_{28-34}$ | $C_{28-34}$ |

Accordingly, the process according to the invention enables the required compounds to be obtained from various waxes in a yield of the order of 53%.

EXAMPLE 3

A mixture containing 100 g jojoba oil, 30 g potassium hydroxide and 1 liter butanol is prepared and saponified in the same way as described in Example 1.

After saponification, 750 ml of a 3% aqueous sulfuric acid solution are added to the mixture which is then stirred for 5 minutes at 80° C. and left to settle. The aqueous phase, which has a pH value of approximately 3, is removed and 30 g calcium hydroxide are added to the organic phase which is then continuously stirred for 60 minutes at 80° C. No formation or precipitation of fatty acid salts is observed, which is probably due to the fact that, since the acids present in jojoba oil are mainly unsaturated fatty acids, their salts are soluble in butanol.

The organic phase is hot-filtered and the butanol is evaporated under reduced pressure at a temperature of 70° C. A crude product in the form of an oil containing the required compounds and the salts of the fatty acids present is obtained in a yield of 106 g. To eliminate these acid salts, the crude product is dissolved in 1,000 ml acetone at 50° C. and the resulting solution is stirred for 30 minutes. The salts of the fatty acids still present precipitate in the form of beige crystals. The mixture is filtered at 25° C. and the acetone is evaporated under reduced pressure. 50.2 g end product in the form of a light yellow oil are obtained.

The end product has the following composition, as determined by GC/MS:

| Residual fatty acids | 0.4% |
| --- | --- |
| Alcohols | 98.0% |
| Others | 1.6% |

Accordingly, the process according to the invention enables the required compounds, essentially monounsaturated fatty alcohols, principally 11-eicosenol and 13-docosenol, which make up 33% and 37%, respectively, of the alcohols obtained, to be obtained in a yield of the order of 50%.

EXAMPLE 4

A mixture containing 100 g jojoba oil, 30 g potassium hydroxide and 1 liter butanol is prepared and saponified in the same way as described in Example 1.

After saponification, 750 ml of a 3% aqueous sulfuric acid solution are added to the mixture which is then stirred for 5 minutes at 80° C. and allowed to settle. The aqueous phase, which has a pH value of approximately 3, is removed and 70 g barium hydroxide $Ba(OH)_2 \cdot 8 H_2O$ are added to the organic phase which is then continuously stirred for 30 minutes at 80° C. No formation or precipitation of the fatty acid salts is observed, which is probably due to the fact that, since the acids present in jojoba oil are mainly unsaturated fatty acids, their salts are soluble in butanol.

The organic phase is hot filtered and the butanol is evaporated under reduced pressure at 70° C. A crude product in the form of an oil containing the required compounds and the salts of the fatty acids present is obtained in a yield of 80 g. To eliminate these acid salts, the crude product is dissolved in 500 ml 94% ethanol at 25° C. and the resulting solution is stirred for 30 minutes. The fatty acid salts still present precipitate in the form of white crystals. The mixture is filtered at 25° C. and the ethanol is evaporated under reduced pressure. 48.4 g end product in the form of an oil having a fatty acid barium salt content of 2% are obtained.

I claim:

1. A process for obtaining compounds from waxes, when insoluble material is formed by the process, comprising saponifying a wax in an organic water-immiscible solvent with an alkali and thereby obtaining a mixture of saponified and unsaponified compounds in the solvent, mixing an aqueous acid solution with the solvent to obtain an acidified mixture having a pH of from 2.5 to 4, allowing the mixture to separate into an aqueous phase and an organic phase, separating the aqueous phase from the organic phase, mixing an alkaline-earth metal hydroxide with the separated organic phase to form salts of fatty acids, and whereby insoluble material is formed from the organic phase, and, separating the insoluble material from the organic phase and then evaporating the organic phase to obtain unsaponified compounds.

2. A process for obtaining compounds from waxes, wherein insoluble material is not formed by the process, comprising saponifying a wax in an organic water-immiscible solvent with an alkali and thereby obtaining a mixture of saponified and unsaponified compounds in the solvent, mixing an aqueous acid solution with the solvent to obtain an acidified mixture having a pH of from 2.5 to 4, allowing the mixture to separate into an aqueous phase and an organic phase, separating the aqueous phase from the organic phase, mixing an alkaline-earth metal hydroxide with the separated organic phase to form salts of fatty acids, and whereby insoluble material is not formed from the organic phase, and evaporating the organic phase to obtain unsaponified compounds.

3. A process according to claim 2 wherein the wax is jojoba oil.

4. A process according to claim 1 or 2 wherein the organic water-immiscible solvent is selected from the group of solvents consisting of butanol and pentanol.

5. A process according to claim 1 or 2 wherein the alkaline-earth metal hydroxide is selected from the group of alkaline-earth metal hydroxides consisting of calcium hydroxide, magnesium hydroxide and barium hydroxide.

6. A process according to claim 1 or 2 wherein the aqueous acid solution comprises sulfuric acid.

7. A process according to claim 6 wherein the organic water-immiscible solvent is selected from the group of solvents consisting of butanol and pentanol and wherein the alkaline-earth metal hydroxide is selected from the group of alkaline-earth metal hydroxides consisting of calcium hydroxide, magnesium hydroxide and barium hydroxide.

8. A process according to claim 1 or 2 further comprising removing fatty acid salts from the unsaponified compounds obtained from the organic phase.

9. A process according to claim 8 wherein the salts are removed by dissolving the unsaponified compounds obtained from the organic phase in a solvent selected from the group of solvents consisting of ethanol and acetone, filtering to remove the salts from the solvent and then evaporating the solvent to obtain the unsaponified compounds.

10. A process according to claim 1 or 2 wherein the wax is contained in a material which contains glycerides and further comprising separating the glycerides from the wax prior to saponifying the wax.

11. A process according to claim 1 wherein the organic water-immiscible solvent has a boiling point of above 75° C., the solvent and acid are mixed at a temperature of from 75° C. to 85° C., the alkaline-earth metal hydroxide is mixed with the organic phase at a temperature of from 70° C. to 90° C. and the insoluble material is separated from the organic phase at a temperature of from 70° C. to 90° C.

12. A process according to claim 2 wherein the organic water-immiscible solvent has a boiling point of above 75° C., the solvent and acid are mixed at a temperature of from 75° C. to 85° C., and the alkaline-earth metal hydroxide is mixed with the organic phase at a temperature of from 70° C. to 90° C.

* * * * *